Oct. 16, 1945.   H. W. HOUSTON   2,386,856
METHOD OF AND APPARATUS FOR PROCESSING PHOTOGRAPHIC FILM
Filed June 26, 1942
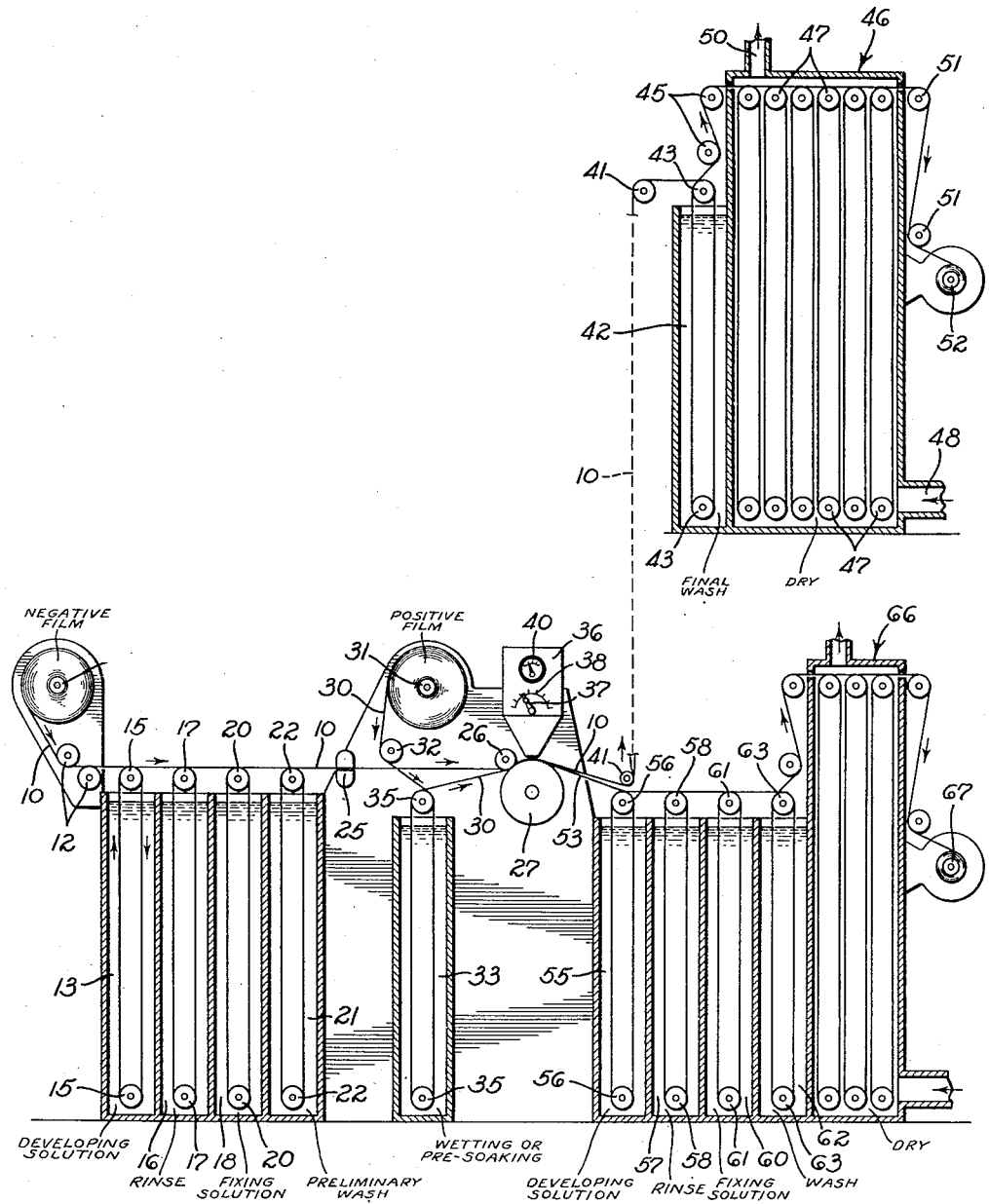
INVENTOR
HERBERT W. HOUSTON
BY HARRIS, KIECH, FOSTER & HARRIS
FOR THE FIRM
ATTORNEYS.

Patented Oct. 16, 1945

2,386,856

UNITED STATES PATENT OFFICE 2,386,856

METHOD OF AND APPARATUS FOR PROCESSING PHOTOGRAPHIC FILM

Herbert W. Houston, Sherman Oaks, Calif., assignor to The Houston Corporation, Los Angeles, Calif., a corporation of California Application June 26, 1942, Serial No. 448,671

2 Claims. (Cl. 95—75)

My invention relates to photography and is directed to an improved method and apparatus for producing a print from an exposed but undeveloped film. While the invention is applicable to still photography, it is particularly useful in the printing or reproduction of motion picture film images and will be particularly described herein as applied to the rapid production of positive motion picture film from an exposed negative motion picture film. Such a disclosure will be found adequate for those skilled in the art who may wish to apply the underlying principles to various other problems in photographic printing, whether related to still photography or motion picture photography, whether the recipient film receives a latent image which is later developed as a positive or a negative, or whether the exposed but undeveloped film contains positive or negative latent images.

The general object of the invention is to produce prints of better quality than heretofore possible, to decrease the time required for the production of the prints, and to provide a novel method and apparatus for accomplishing these results.

In conventional motion picture practice, the roll of exposed negative film is developed, fixed, washed, and dried before being sent to the printing machine for production of latent images on a positive film, which latent images are subsequently developed, fixed, washed, and dried. This procedure is time-consuming, particularly where (as is often the case) test strips are printed from each scene to determine the final printing conditions. Such processes usually require from six to eight hours' time between receipt at the laboratory of the exposed negative film and completion of the desired positive. It is an object of the present invention to shorten this time materially, this being particularly advantageous under circumstances involving the filming of military objectives, etc., and where it is vitally important to obtain positive prints in a minimum of time.

In such procedures in which the dry positive film is printed or exposed through a dry negative film, the resulting positive images are inferior to the corresponding images on the negative film for a number of reasons. In the first place, the dry gelatin of the negative film is somewhat granular in structure and, therefore, favors diffusion of transmitted light. In the second place, minute irregularities are created in the surface of the negative film by the removal of light-sensitive particles therefrom in the course of fixing, and these minute irregularities likewise tend to diffuse the light. In the third place, it is difficult to achieve intimate contact between the two films with substantially total absence of air therebetween. In the fourth place, a certain amount of shrinkage of the negative film is caused by the processing and drying of the film prior to the printing operation, and such shrinkage may make it difficult to achieve proper registration of the two films.

It is an object of the present invention to minimize, if not entirely eliminate, these various reasons for less definition and less quality in the positive images.

The present invention involves, in one of its aspects, the transmission of light through images on a wet imaged film to a recipient film in contact therewith to produce a latent image which, when developed, is of superior quality, and it is an object of the present invention to provide a novel method and apparatus for the production of such high-quality images on a recipient film by employment of a wet negative film.

Distinct advantages accrue from a pre-soaking of the recipient film for a time sufficient to cause penetration of the emulsion by the soaking liquid, as well as from a subsequent pressing of the pre-soaked and imaged films together preparatory to the printing operation, and the invention includes a novel method and apparatus for accomplishing this result.

The above and other objects and advantages of the invention will be apparent to those skilled in the art from the following description taken with the accompanying drawing.

The accompanying drawing, which is to be regarded as illustrative only, shows diagrammatically an apparatus for carrying out a preferred practice of my invention.

As shown in the drawing, exposed but unprocessed negative film 10 is continuously fed from a spool 11 past guide rollers 12 to a developing tank 13 wherein the traveling film is guided by upper and lower rollers 15 to move one or more times through a developing solution of any well-known composition. From the developing tank 13, the film passes to a stop or rinse tank 16 where it moves through a rinsing solution, which may comprise fresh water, being guided in this movement by upper and lower rollers 17. The purpose of this rinsing step is to remove excess developing solution preparatory to passage through a fixing tank 18 containing a conventional fixing solution. The fixing tank provides upper and lower rollers 20 for guiding the film to move through the fixing solution one or more times. The steps performed and the solutions employed in the apparatus thus far described may be those conventionally known in the art.

From the fixing tank 18, the film moves into a wash tank 21 where it moves to and fro one or more times through a washing liquid, such as water, being guided by rollers 22. The invention may follow conventional practice in this washing step as to the washing medium and the time employed, in which event substantially all of the fixing solution will be washed from the film in this step. However, it is often advantageous to use a washing step which is much shorter than conventional, effecting only a preliminary wash at this stage and completing the washing at a later stage, as will be subsequently described. It is only necessary to employ such superficial washing in the tank 21 as will remove that amount of the fixing solution which might be detrimental through impeding development of a latent image on a recipient film subsequently brought into contact with the wet negative film.

From the wash tank 21, the negative film may be led to a suitable density-measuring device 25, which may be of known construction. This device gives the operator an indication of the desired adjustment of the printing light to produce a correctly exposed latent image on the recipient or positive film.

The still-wet negative film 10, now imaged, is led through a squeegee device comprising a rotary squeegee roll 26 and a printing drum 27, the negative film being pressed toward the periphery of the printing drum and into contact-printing relationship with a positive or recipient film, indicated generally by the numeral 30.

In the preferred embodiment of this invention, this unexposed positive film 30 is preferably pre-soaked and delivered to the printing position in wet state. Such pre-soaking may be accomplished by continuously feeding unexposed positive film 30 from a spool 31 past a guide roller 32 to a wetting tank 33 having upper and lower guide rollers 35 permitting the film to move one or more times through a suitable liquid in the tank 33. This liquid may comprise plain water or water in combination with a wetting agent. The liquid is desirably slightly alkaline and may well have a pH value similar to that of conventional developing solutions. In fact, I find it preferable to utilize as this liquid a conventional developing solution having properties similar to, or identical with, the developing solution later employed for developing latent images formed on the positive film in the printing step. The time involved in this pre-soaking step may be relatively short, though it is greatly preferred to retain the positive film 30 in the tank 33 for a time sufficient to permit substantially complete penetration of the emulsion by the wetting solution. This soaking time will be dependent upon the temperature and concentration of the solution, and a wetting agent such as "Calgon" or "Aersol" may be employed to shorten the soaking time and insure even penetration of the solution into the photographic emulsion. These exemplified wetting agents are exemplary of a large number of wetting agents which can be employed in the prompt and uniform wetting and soaking of the positive film. Substantially complete penetration of this emulsion by the solution, and particularly by a developing solution, is desirable and helps to eliminate surface development or uneven development in the later steps, serving to prevent progressive development of the latent image from the surface to the back of the emulsion. Images of higher quality result from such pre-soaking, particularly as evidenced by the production of better half-tones and cleaner high lights without adding to the contrast.

From the wetting tank 33, the positive film 30 moves in wet condition toward the printing position, being drawn between the rotary squeegee 26 and the printing drum 27 to be pressed against the wet negative film 10. The squeegee action is such as to dispel all air bubbles from between the two films and to bring these films into contact-printing relationship. The surface liquid from one or both films tends to flood or fill the minute irregularities in the surface of the negative film, and the films move in contact with each other to the printing position while they are held taut in conformity with the periphery of the rotating printing drum 27.

Production of the latent image on the unexposed positive film 30 is effected at the printing position by use of a suitable printing light (not shown in detail) enclosed in a lamp box 36 and directing a beam of light for transmission through the imaged negative film onto the underlying positive film. The amount of light employed in this printing step can be adjusted by any suitable means, for example, by adjustment of a manual control member 37 connected electrically to the printing light and being movable with reference to a calibrated scale 38. The operator adjusts the control member 37 periodically or whenever required, and is guided in such adjustment by the density-measuring device 25 or a negative-density indicator 40 responsive thereto.

After movement through the printing position, the negative film 10 separates from the exposed positive film and is guided by rollers 41 to a wash tank 42 for removal of the remaining residual fixing solution in the event that the film has not been completely washed in the tank 21. The wash tank 42 is provided with upper and lower rollers 43 for moving the film one or more times through the wash liquid. From the wash tank 42, the negative film 10 advances, as guided by rollers 45, to a drying cabinet 46 wherein it moves as guided by rollers 47. The drying cabinet 46 is provided with an air inlet port 48 and an air exhaust port 50 for circulating drying air in contact with the film. The completely dried negative film is led by guide rollers 51 to a winding spool 52.

The exposed positive film moving from the printing position is indicated by the numeral 53 and is advanced to a developing tank 55 having upper and lower guide rollers 56 serving to move the film one or more times through a conventional developing solution. In the printing of positive films, the developed latent image is fixed and the film washed and dried in a manner similar to that previously described. For example, the exposed positive film 53 may move continuously through a stop or rinse tank 57 having upper and lower rollers 58, then through a fixing tank 60 containing a conventional fixing solution, being guided by upper and lower rollers 61, and then through a wash tank 62, being guided by rollers 63 to move through the washing liquid. Finally, the positive film is led through a drying cabinet 66 of the type heretofore described to dry the film and complete the process herein contemplated, after which the film is led to a winding spool 67.

It is to be noted that the negative film, while in wet state, is brought into contact-printing relationship with the unexposed positive film 30 in the manner previously described, though it should be apparent that, in some instances, the wetting tank 33 may be omitted and the dry positive film fed to the squeegee device so that the positive film receives liquid solely by contact with the wet negative film. However, for best-quality prints, the invention contemplates the pre-soaking of the positive film. It will be understood, also, that the invention can be employed in the making of duplicate negative films by employment of conventional reversal steps performed after suitable development in the tank 55, using tanks 57, 60, and additional tanks if required, for this function.

The following are some of the advantages of exposing the positive or recipient film through the wet negative film in the manner described.

(1) The dry gelatin of a completely processed negative film is somewhat granular in structure and, therefore, tends toward undesirable diffusion of the transmitted light employed in the printing step, whereas wet gelatin has no granular characteristic and permits better light transmission.

(2) An exposed and fixed negative film has minute surface irregularities especially in halftone areas caused by removal of light-sensitive particles, the negative surface being minutely rough in the manner of ground glass. When such a negative is in wet state, the minute surface irregularities are flooded by liquid to cause better transmission of light just as ground glass in wet state is more nearly transparent than when in dry state.

(3) The presence of residual liquid between the two films not only has a beneficial effect with respect to the minute irregularities in the negative surface but also facilitates intimate contact between the two films. It is easier to exclude air between two wet films than to exclude air between two dry films, and it is easier to maintain two wet films in intimate contact with each other. Intervening moisture seals out air and creates a tendency for the two films to cling together, this being particularly desirable during passage through the printing position.

(4) The pressure exerted by the squeegee against the printing drum is highly effective for excluding intervening air and presses the two films into intimate contact with each other for movement in a unitary manner past the printing light.

(5) The difficulty of attempting to register a dry shrunk negative with an unshrunk positive is avoided because, in the present process, the negative is applied to the positive prior to shrinkage.

(6) Considerable time is saved in the production of the positive film as it is not necessary to complete the washing of the negative film nor to effect the drying thereof before exposing the positive film.

(7) The procedure involved in the present invention permits the production of projectible positive film in a very short period of time, particularly if fast-acting solutions are employed.

It is to be noted that the invention proposes a novel process and apparatus whereby some of the film processing steps, as applied both to the negative film and to the positive film, are performed simultaneously, e. g., the final washing and drying of the negative film may take place concurrently with the processing of the positive film.

In addition, numerous advantages accrue from the pre-soaking of the positive film, some of which have been outlined above. It should be noted in addition, however, that pre-soaking of this film causes the pores of the emulsion to open and the emulsion to swell. The emulsion in this condition retains the fine lines and detail from the negative better in that, when the printing exposure is made, the emulsion is "expanded" and when it "contracts" and shrinks in drying, the final detail is free of fringe and is more sharply defined. It is to be noted also that the invention involves no problem of registration between expanded and unexpanded films if the positive film is pre-soaked before being printed through a wet negative film, and that the image dimensions on the finished negative and positive films will be identical.

One of the most important features of the invention is its ability to produce better half-tones and cleaner high lights without adding to the contrast, as noted above. This action is relatively independent of any "shielding" action through development of the latent image during the time that the positive film is being printed. Pre-soaking of the positive film by a developing solution is advantageous in permitting the developing process to start as soon as the latent image is formed but, in practice, the time during which the positive film is exposed to light rays passing through the negative film is so short relative to the required developing time that no substantial development of the latent image occurs while subject to the light rays and, thus, no substantial "shielding" action is obtained such as might substantially decrease contrast.

The preferred practice of my invention as illustrated herein will suggest to those skilled in the art various modifications and substitutions under my basic concept, and I reserve the right to all such departures from my disclosure that come within the scope of the appended claims.

I claim as my invention:

1. In an apparatus for producing prints from an exposed motion picture film, the combination of: a first motion-picture-film-processing means including developing means, fixing means, two washing means, and a drying means; means for advancing a strip of exposed motion picture film progressively through said developing, fixing, washing, and drying means; a printing means disposed to receive said advancing film at a position between said two washing means and while said film is wet; a pre-soaking tank containing a liquid; means for advancing a recipient motion picture film through said pre-soaking tank to wet same preparatory to contact with and printing through the other film; means for delivering said recipient motion picture film while wet to said printing means and for maintaining said films in contact with each other during passage through said printing means whereby latent images are formed on said recipient film by said printing means; a second motion-picture-film-processing means including developing means, fixing means, washing means, and drying means; and means for separating said films and for delivering said recipient film to said second processing means and for delivering said first-named film to said second washing means and said drying means of said first motion-picture-film-processing means whereby the washing of said first-named film and the drying thereof are completed during the passage of said recipient film through said second processing means.

2. An apparatus for producing a dried positive film containing a plurality of frames or pictures directly from an exposed but undeveloped negative film containing latent images of said pictures, which comprises: developing, fixing, and washing tanks, each containing an appropriate solution; means for guiding said exposed negative film through said tanks; a printing device containing a light source; means for guiding said negative film through said printing device while still wet from said washing bath; a positive presoaking tank containing a liquid suited to wet a positive film; means for guiding an unexposed and undeveloped positive film through said presoaking tank and to and through said printing device in intimate contact with said wet developed negative film in such a manner that there is no relative movement between said positive and said negative films as they pass through said printing device, the positive film being so guided and protected from casual light that only light from said light source that has passed through said negative film reaches the positive film; a final negative washing tank containing final wash water; a negative drying means; means for guiding said negative film to said final negative washing tank from said printing device and through said final negative washing tank and through said negative drying means; positive developing, fixing, and washing tanks, each containing an appropriate liquid so that the positive may be developed, fixed, and washed in its passage through said respective tanks; means for guiding said positive film to said positive developing tank from said printing device and for guiding said positive film through said positive developing, fixing, and washing tanks; a positive drying means; means for guiding said positive film from said positive washing tank to said positive drying means and through said means; means for driving said negative film through said apparatus; and means for driving said positive film through said apparatus at a speed synchronous with the speed of the negative film.

HERBERT W. HOUSTON.